United States Patent [19]

Retallick et al.

[11] Patent Number: 5,437,099
[45] Date of Patent: Aug. 1, 1995

[54] METHOD OF MAKING A COMBUSTION APPARATUS FOR HIGH-TEMPERATURE ENVIRONMENT

[75] Inventors: William B. Retallick, West Chester, Pa.; William R. Alcorn, Chagrin Falls, Ohio

[73] Assignee: W. R. Grace & Co.-Conn., New York, N.Y.

[21] Appl. No.: 257,134

[22] Filed: Jun. 9, 1994

Related U.S. Application Data

[60] Division of Ser. No. 953,939, Sep. 30, 1992, Pat. No. 5,346,389, which is a division of Ser. No. 408,521, Sep. 18, 1989, Pat. No. 5,202,303, which is a continuation-in-part of Ser. No. 315,048, Feb. 24, 1989, abandoned.

[51] Int. Cl.$^6$ ............................................. B23P 15/00
[52] U.S. Cl. ........................................ 29/890; 29/458
[58] Field of Search ................... 29/890, 452; 431/7, 431/170; 122/45; 60/723; 502/439, 527

[56] References Cited

U.S. PATENT DOCUMENTS

| | | |
|---|---|---|
| 3,088,271 | 5/1963 | Smith . |
| 3,925,001 | 12/1975 | Salooja . |
| 3,992,330 | 11/1976 | Noakes ................... 29/840 |
| 4,008,570 | 2/1977 | Harada ................... 60/299 |
| 4,072,007 | 2/1978 | Sanday ................... 60/723 |
| 4,375,949 | 3/1983 | Salooja . |
| 4,382,323 | 5/1983 | Chapman ................... 29/890 |
| 4,711,609 | 12/1987 | Cornelison et al. ................. 422/180 |
| 4,725,411 | 2/1988 | Cornelison ................... 422/180 |
| 4,753,919 | 6/1988 | Whittenburger ............... 502/527 X |
| 4,838,067 | 6/1989 | Cornelison ................... 29/157 R |
| 5,202,302 | 4/1993 | Retalick et al. ................... 431/7 |

FOREIGN PATENT DOCUMENTS

| | | |
|---|---|---|
| 57-10207 | 12/1982 | Japan . |
| 0126140 | 8/1984 | Japan . |
| 61-259013 | 11/1986 | Japan . |
| 61-289220 | 12/1986 | Japan . |

Primary Examiner—Irene Cuda
Attorney, Agent, or Firm—Beverly J. Artale

[57] ABSTRACT

A method of making a novel structure for the first stage of a multiple-stage combustion, in which a metal strip is coated with a catalyst on only one side. The strip is also corrugated with a herringbone pattern. The strip is then folded back and forth upon itself to form a reactor of a desired cross-section. The reactor has rows of channels that are formed between the layers of the metal. The single coated side of the metal defines the walls of the channels in every other row. The fuel-air mixture that flows through the coated channels is combusted. The fuel-air mixture that flows through the uncoated channels is not combusted, and cools the catalyzed surfaces. The herringbone corrugations prevent the layers of metal from nesting together, and also define zigzag paths for flow of combustion gas. The one or more stages subsequent to the ignition stage can employ a catalyst capable of operating at the very high temperatures present in gas turbines. The subsequent stages can also be non-catalytic. Thus, the first stage provides catalytic ignition, and the subsequent stages complete the combustion.

17 Claims, 4 Drawing Sheets

METHOD OF MAKING A COMBUSTION APPARATUS FOR HIGH-TEMPERATURE ENVIRONMENT

CROSS-REFERENCE TO PRIOR APPLICATION

This is a division of application Ser. No. 07/953,939, filed Sep. 30, 1992, now U.S. Pat. No. 5,346,389 which is a division of application Ser. No. 07/408,521, filed Sept. 18, 1989, now U.S. Pat. No. 5,202,303, which is a continuation-in-part of Ser. No. 07/315,048, filed Feb. 24, 1989, now abandoned.

BACKGROUND OF THE INVENTION

This invention provides a combustion apparatus which can be used in a high-temperature environment, such as in a gas turbine.

Gas turbines have been used in the generation of electric power. Considerations of efficiency require that the turbines operate at high temperatures, for example, 2300° F. or greater. In a conventional thermal (i.e. non-catalytic) combustion apparatus, all of the fuel is mixed with part of the combustion air, and the mixture is burned in a flame. The flame temperature exceeds 3000° F., and at such high temperatures, nitrogen oxides ($NO_x$) are formed from the nitrogen in the air. The combustion gas at 3000° F. or higher is mixed with the remainder of the combustion air to cool the mixture to about 2300° F., which is a safe temperature for injecting into the gas turbine. The production of unacceptably large amounts of nitrogen oxides is a major disadvantage of conventional gas turbine systems.

To eliminate the production of $NO_x$, it has been proposed to burn the fuel at a lower temperature and to complete the combustion with a catalyst. By adjusting the amount of fuel so as to keep the temperature of combustion below about 2300° F., one can eliminate the production of $NO_x$. However, at the lower temperatures, the combustion is not complete, resulting in an emission of unburned hydrocarbons. Furthermore, natural gas and air may not be uniformly mixed, thus permitting regions of combustion exceeding 3000° F. A catalytic converter assures mixing and produces a homogeneous flame front under 3000° F.

However, at temperatures of 2300° F. or greater, metal catalysts such as platinum or palladium cannot be used. At such temperatures, the metals are volatile. For this reason, the useful lives of catalytic converters of the prior art, when used in high-temperature environments, are unacceptably short.

It has been known to use oxides of rare earth metals as catalysts in high-temperature environments, such as in the operation of gas turbines. For example, terbium oxide, applied to a ceramic support, has been used. Terbium oxide has sufficient activity at 2300°F. to complete the combustion, and will withstand the high temperatures of the gas turbine. Another class of materials believed to be practical as high-temperature catalysts are the refractory metal silicides described in copending U.S. patent application Ser. No. 279,455, filed Dec. 5, 1988, entitled "A Gas Modifying Reactor and Method of Modifying a Reactive Gas Composition".

The ceramic supports used in the prior technology have major disadvantages. Ceramic supports are likely to shatter due to thermal shock.

If one wants to provide a practical combustion apparatus, it is necessary to build the apparatus in stages. An ignition stage, having a metal catalyst, is used to start the combustion. The subsequent stages, operating at high temperatures, carry the combustion to completion.

Even in a two-stage apparatus, there is still the danger of thermal damage to the metal catalyst. It has been suggested that the temperature in the ignition stage could be controlled by simply reducing the length of the ignition catalyst so that the first stage of combustion is less complete. But it has been shown both theoretically and experimentally that the ignition catalyst cannot be saved from overheating simply by shortening the combustion channels.

When a fuel-air mixture flows through the channels of a catalytic reactor, the temperature of the mixture increases smoothly as the combustion proceeds. But the temperature of the catalyst-bearing wall of the channel does not increase smoothly. Instead, this temperature increases rapidly near the entrance to the channel and approaches the adiabatic combustion temperature. Then it remains close to the adiabatic combustion temperature over the length of the channel.

If the channel is too short to achieve complete combustion, the temperature of the exiting gas will be below the adiabatic combustion temperature. Even so, the temperature of the catalyst-bearing wall will be close to adiabatic, over all but the front end of the channel.

This behavior of the temperature at the channel wall is not anomalous. It is predicted by mathematical models of the combustion process. Recent experimental work confirms the models. The work was done by D. A. Santavicca at Pennsylvania State University under contract from the U.S. Air Force Office of Scientific Research, Contract No. AFOSR84-0224. He constructed a stack of catalyst-bearing metal plates which were 50 mm wide and 100 mm long, and having a thickness of 1 mm. The plates were spaced 6 mm apart. The fuel-air mixture flowed parallel to the 100 mm length of the plates. Tiny holes were drilled into the edges of the plates at distances, from the leading edge, of 3 mm, 38 mm, and 97 mm. Thermocouples in the holes showed that the temperature of the catalyst-bearing surface does indeed rise to the adiabatic temperature, close to the leading edge, and remains at the adiabatic temperature over the remainder of the flow path.

Thus, even if the catalytic combustion channel is shortened, the catalyst-bearing walls will still reach the adiabatic temperature and the catalyst will be deactivated. It is therefore necessary to cool these walls with a part of the fuel-air mixture that is not being combusted. The present invention provides a structure for cooling the walls. This structure can be used with a gas turbine, such as in the environment described in the above-identified copending patent application, and in other environments.

SUMMARY OF THE INVENTION

The present invention includes a structure for the ignition stage of a multiple-stage combustion apparatus, for use in a high-temperature process. The invention also includes a method of making this ignition stage.

The ignition stage can be made from a single piece of metal, especially a metal foil. The foil is first corrugated, preferably with a herringbone or "chevron" pattern. Then, the foil is coated with a catalyst on only one side. The foil is then folded upon itself to form a structure known as a "honeycomb". The folding creates channels for gas flow, wherein alternate channels are defined by the coated surface of the foil, and wherein the remaining channels are defined by the uncoated surface. The corrugations prevent the layers of metal from nesting together, and also define a zigzag path along which the combustion gas can flow. Moreover, the gas can flow from one side of the combustor to the other (.i.e. generally perpendicular to the main direction of gas flow).

In an alternative embodiment, two pieces of foil are wound together into a spiral, so as to provide alternating coated and uncoated channels. In still another embodiment, Individual pieces of foil can be stacked, again providing alternating coated and uncoated channels. In the latter embodiments, as in the first embodiment, the foil is corrugated so that a predetermined spacing between layers of the foil is maintained.

The fuel-air mixture that flows through the coated channels is combusted, while the Fuel-air mixture that flows through the uncoated channels is not combusted. Instead, the uncombusted mixture cools the catalyzed surface, which prevents the catalyzed surface From being overheated and deactivated.

The foil can also include bands of uncoated regions, so as to reduce the overall ratio of coated to uncoated area. The bands can be arranged either parallel or perpendicular to the direction of gas flow.

The catalyst applied to the foil, in the first stage, is preferably a metal catalyst, such as one selected from the platinum group, and one which has sufficient activity to ignite the fuel-air mixture at a relatively low temperature.

The ignition stage described above is combined with one or more subsequent combustion stages. The subsequent stages can use a catalyst capable of operating at temperatures of 2300° F. or higher without losing activity, or they can employ gas phase combustion.

It is therefore an object of the present invention to provide a catalytic combustion apparatus for use in a high-temperature environment.

It is another object to provide a method for making a catalytic combustion apparatus for use in a high-temperature environment.

It is another object to provide a method for making a catalytic ignition stage which does not become so hot that its metal catalyst becomes deactivated.

It is another object to provide a combustion apparatus which can be used with a gas turbine system to insure complete combustion and to reduce or eliminate the formation of nitrogen oxides, wherein the apparatus has a long useful life.

It is another object to make it more practical to employ a catalytic reactor in a high-temperature environment.

Other objects and advantages of the invention will be apparent to those skilled in the art, from a reading of the following brief description of the drawings, the detailed description of the invention, and the appended claims.

DETAILED DESCRIPTION OF THE INVENTION

The present invention is a multiple-stage combustion apparatus for use in a high-temperature environment, and a method for making the apparatus. The first stage is the ignition stage, and employs a catalyst, such as a metal from the platinum group, which ignites the incoming fuel-air mixture. This ignition stage must burn the fuel-air mixture only partly, so that the temperature of the gas leaving the first stage of the combustion apparatus is not higher than about 1500° F.

Figure 1:
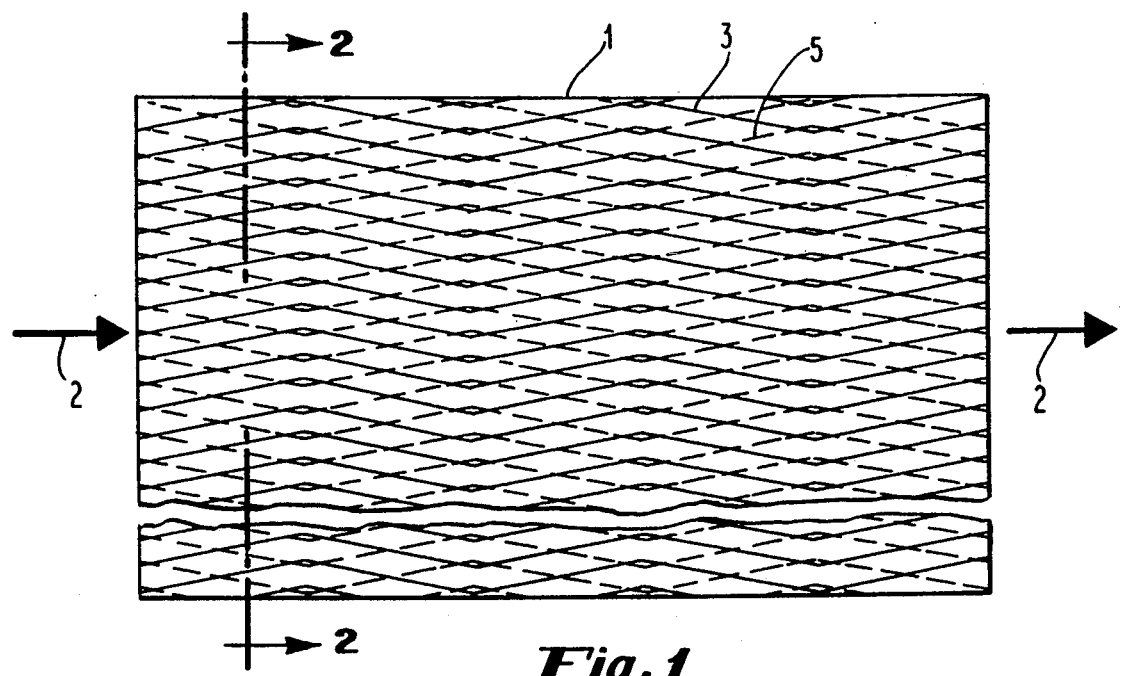
FIG. 1 is a partially fragmentary plan view of a piece of metal foil which has been corrugated with a herringbone pattern and which has been folded back forth upon itself to form the ignition stage of the combustion apparatus of the present invention.

FIG. 1 shows strip 1 of metal having herringbone, or "chevron", corrugations. Preferably, the strip is a foil, but the invention can work with strips of considerably greater thicknesses. The strip is first corrugated and then coated with catalyst on only one side. The strip is then folded back and forth upon itself; FIG. 1 shows the top layer in full and the next layer in phantom. The corrugations in the top layer are indicated by reference numeral 3, and the corrugations in the next preceding layer are indicated by reference numeral 5. The corrugations are arranged such that the corrugations in adjacent layers are generally out of phase, thereby avoiding nesting of the layers. Arrows 2 indicate the general direction of gas flow.

Figures 2, 3:
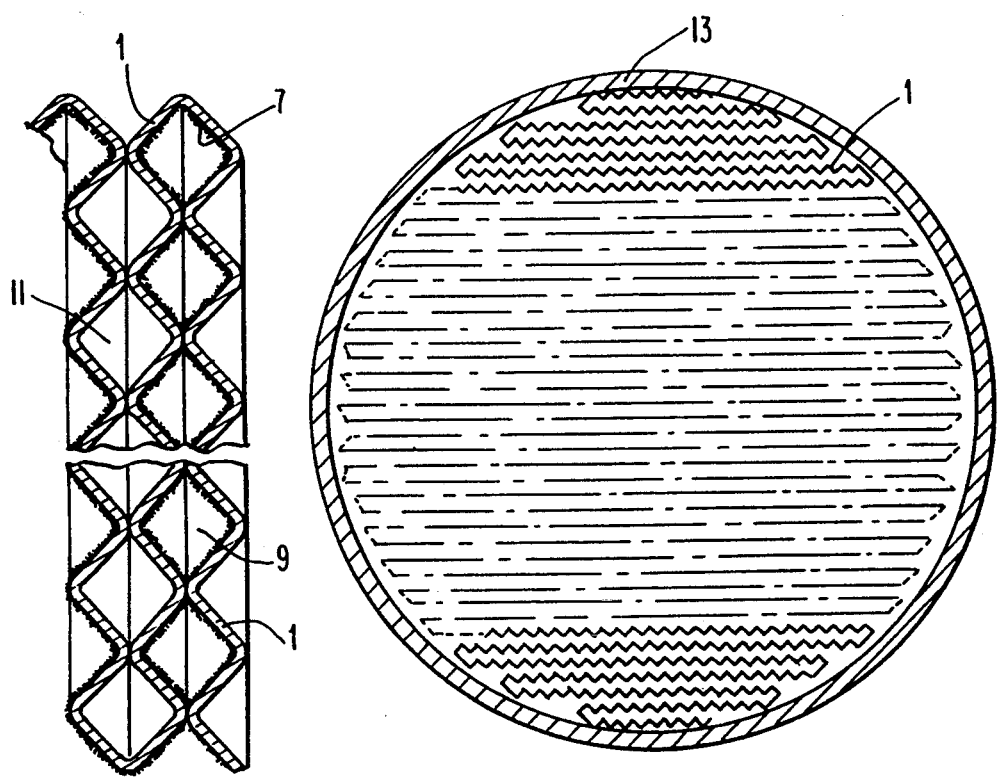
FIG. 2 is a cross-sectional view taken along the line 2—2 of FIG. 1, showing the channels formed by the folding of layers of the foil.
FIG. 3 is a fragmentary end view of a catalytic reactor made according to the present invention, wherein tile foil is folded back and forth upon itself to define a generally circular cross-section.

FIG. 2 is a cross-sectional view taken along the line 2—2 of FIG. 1, showing the channels formed by the layers of the strip. As is seen in FIG. 2, strip 1 has a catalyst coating 7 on only one side. The folded strip defines channels 9, all surfaces of which are coated with catalyst, and channels 11, the surfaces of which are not coated. The coated and uncoated channels alternate with each other. The direction of gas flow, in FIG. 2, is perpendicular to the paper. Thus, about half of the gas flows through the coated channels and the remainder flows through the uncoated channels.

As is apparent from FIG. 1, the combustion gas flows through zigzag channels defined by the herringbone corrugations. Thus, the gas almost never flows exactly parallel to arrows 2; the arrows show only the general direction of gas flow.

The zigzag path is advantageous, in that it provides better heat and mass transfer. A zigzag path connecting two points is, by definition, longer than a straight path connecting those points. Thus, with the zigzag path, the gas has more opportunity to contact the reactive walls of the channels, and more opportunity to transfer heat. The result is that one can achieve the same ignition effect with a shorter length of catalyst. The zigzag path can thus reduce the amount of catalyst required.

FIG. 2 is taken along the particular line 2—2 of FIG. 1. If the cross-section were taken at another point, the relative "phase" of the corrugations would be different. Due to the herringbone configuration, the adjacent layers will not nest together.

Note also that the combustion gas, while traveling in the general direction indicated by arrows 2, can still traverse the width of the reactor, i.e. in a direction generally perpendicular to the direction of gas flow. This transverse flow of gas also has advantages. At the expense of some pressure drop, it also provides a higher rate of mass transfer, which further enhances the efficiency of the ignition stage.

The strip can be folded into many different shapes. FIG. 3 shows one example. In FIG. 3, strip 1 has been folded back and forth to define a generally circular cross-section, and has been encased within canister 13. Only some of the layers are shown in FIG. 3, and the catalyst coating is not shown explicitly. Many other shapes can be formed by folding the strip back and forth upon itself, in the manner shown in U.S. Pat, Nos. 4,576,800 and 4,838,067, the disclosures of which are incorporated by reference herein.

The half of the fuel-air mixture that flows through the coated channels is combusted. The half of the fuel-air mixture that flows through the uncoated channels is not combusted. Instead, this uncombusted mixture cools the catalyst-bearing surface, thus preventing that surface from being overheated and deactivated.

Figure 4:
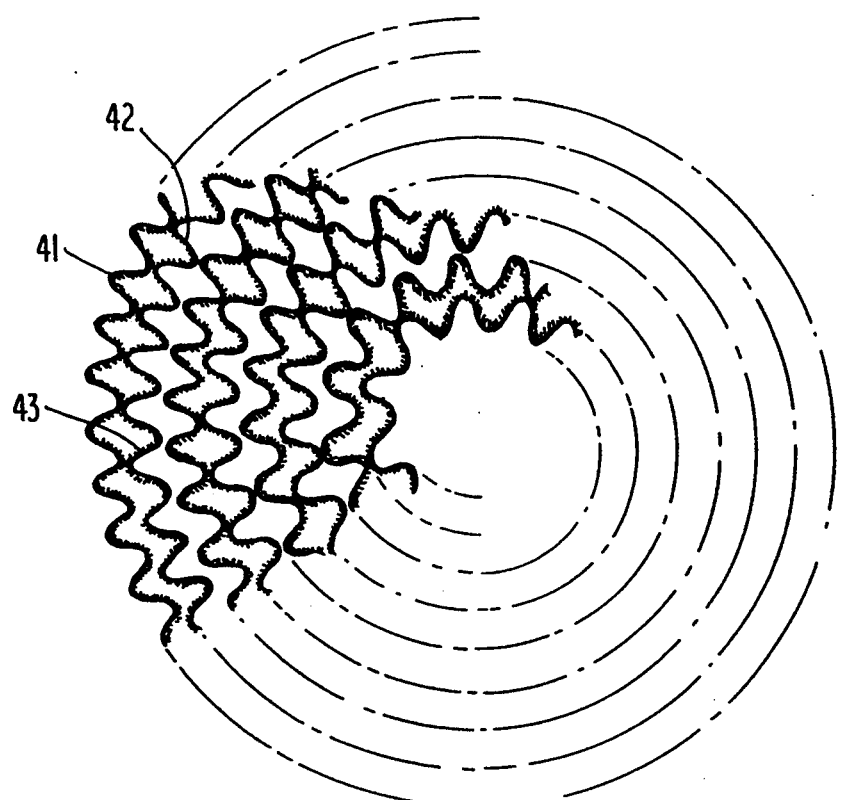
FIG. 4 is fragmentary end view of a catalytic reactor made according to another embodiment of the present invention, wherein two pieces of foil are wound into a spiral.

Two strips similar to that shown in FIG. 1 can be laid one on the other and then wound into a spiral to make the circular catalytic igniter of FIG. 4. FIG. 4 is a fragmentary view, showing strips 41 and 42, both strips having a catalyst coating 43 on only one side. Alternatively, strips 41 and 42 can be a single strip that has been folded upon itself about a point near its midpoint. In both FIGS. 3 and 4, there are thus alternating rows of coated and uncoated channels. In either case, the walls of the coated channels are cooled by the uncombusted fuel-air mixture flowing through the uncoated channels.

Figure 5A:
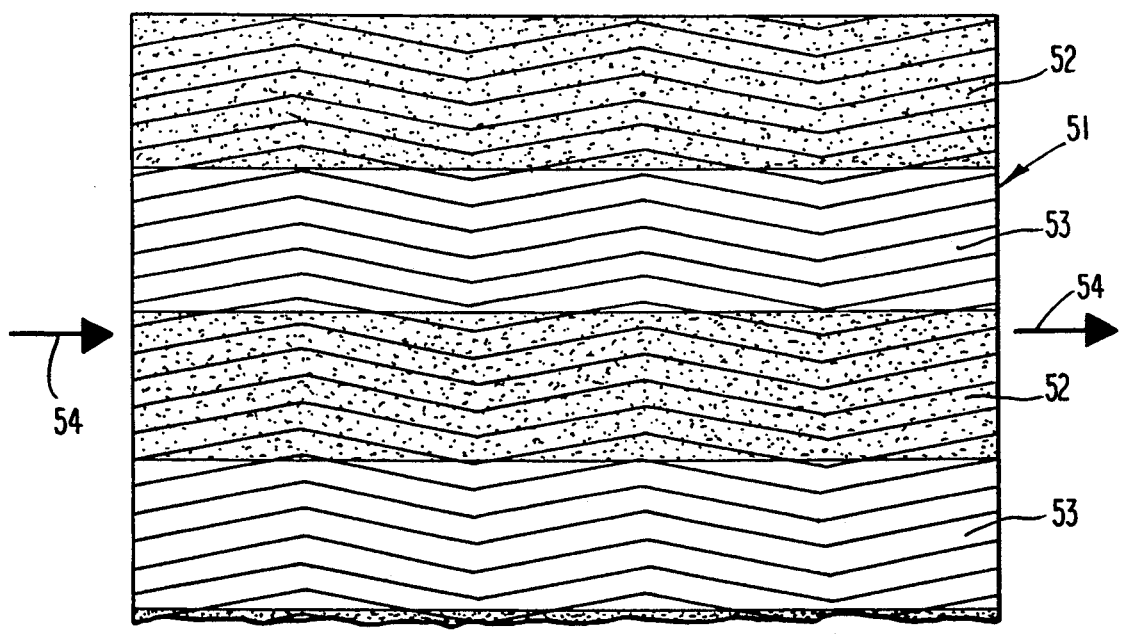
FIGS. 5A and 5B are views similar to FIG. 1, showing bands of coated and uncoated regions, with the direction of gas flow being parallel and perpendicular to the direction of the bands, respectively.
Figure 5B:
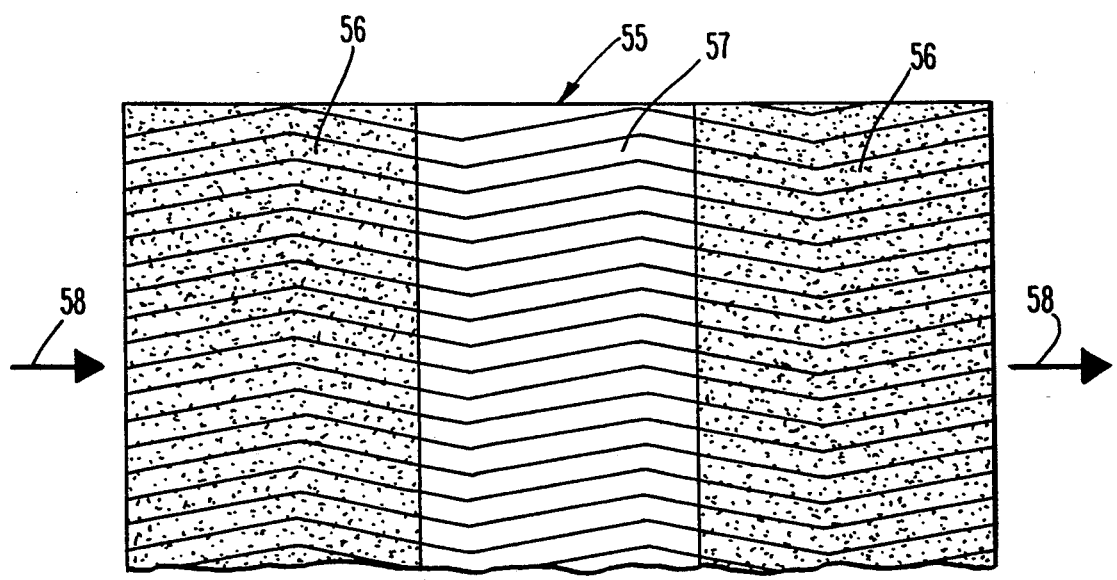

When one side of the strip of foil is completely coated with catalyst, the area available for cooling cannot exceed the coated area. If additional cooling area is needed to prevent the coated area from overheating, such area can be provided by dividing the coated region into bands that are separated by uncoated bands. The bands can extend either along the length of the strip or across the width of the strip. The latter embodiments are illustrated in FIGS. 5A and 5B. FIGS. 5A and 5B are views similar to FIG. 1. In FIG. 5A, strip 51 includes coated regions 52 and uncoated regions 53. Gas flows in the direction indicated by arrows 54. In FIG. 5B, strip 55 includes coated regions 56 and uncoated region 57. Gas flows in the direction indicated by arrows 58.

The catalytic reactor need not be constructed from a single strip of foil, although the single strip 1s likely to provide the simplest construction. Instead of folding a single strip, individual strips can be stacked to make a layered honeycomb. As explained above, two strips can be wound together to make a spiral honeycomb.

Herringbone corrugations are not necessary, although they are likely to provide the simplest construction. The reactor could be built up from alternating flat strips and strips having straight corrugations. The flat strips would be coated with catalyst on only one side, and the corrugated strips would not be coated at all.

Figure 6:
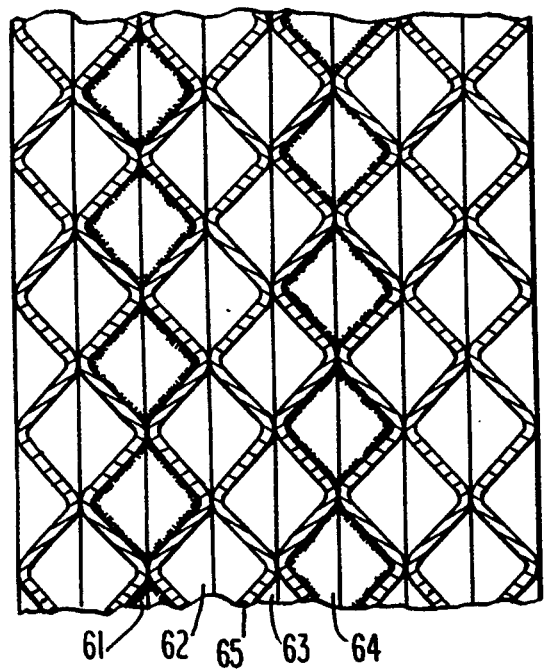
FIG. 6 is a view similar to FIG. 2, showing an embodiment wherein there are two uncoated channels surrounding each coated channel.

The pattern of alternating coated and uncoated channels can be varied. For example, it is possible to provide two or more uncoated channels between the coated channels. FIG. 6 shows a construction wherein every coated channel is surrounded by two uncoated channels. The reactor of FIG. 6 is made of separate strips which are stacked together. Channels 61 and 64 are coated, while the two intervening channels 62 and 63 are not coated. Thus, strip 65 is not coated on either side. If another uncoated strip were inserted adjacent to strip 65, coated channels 61 and 64 would be separated by three uncoated channels. The third uncoated channel would be sandwiched between two other uncoated channels, and would be the least effective of the three. Ordinarily, the coated channels would not be separated by more than two uncoated channels. It would normally not be desirable to allow two coated channels to be adjacent to each other, because such a construction would not adequately cool all the coated channels, and would therefore lead to deactivation of the catalyst.

The embodiment of FIG. 6 is most readily constructed of separate strips, but other methods of construction are possible, and are included within the scope of this invention.

In all cases, one must be sure that adjacent layers do not nest together, so as to provide an unobstructed path for gas flow.

Thus, the ignition stage reactor of the present invention can be described, in its most general form, as having a plurality of coated channels which are interspersed with a plurality of uncoated channels.

In applying a catalyst to a metal support, is it common first to apply a coating of alumina, in the form of a slurry or "washcoat", and then to impregnate the washcoat with the catalyst. This procedure is described in U.S. Pat. No. 4,601,999, the disclosure of which is incorporated by reference herein. It has also been known to combine the washcoat and catalyst into one composition, and to apply that composition directly to the metal support. U.S. Pat. No. 4,762,567, the disclosure of which is incorporated by reference herein, describes such a washcoat. If a separate washcoat is used, it is possible to coat both sides of the metal strip with the washcoat, and then to impregnate only one side with catalyst. In fact, it may be easier to apply a washcoat to the entire strip and then to coat only one side with catalyst. Both alternatives are within the scope of the present invention. What is important is that the initial catalytic combustion stage include catalyzed and non-catalyzed channels.

Figure 7:
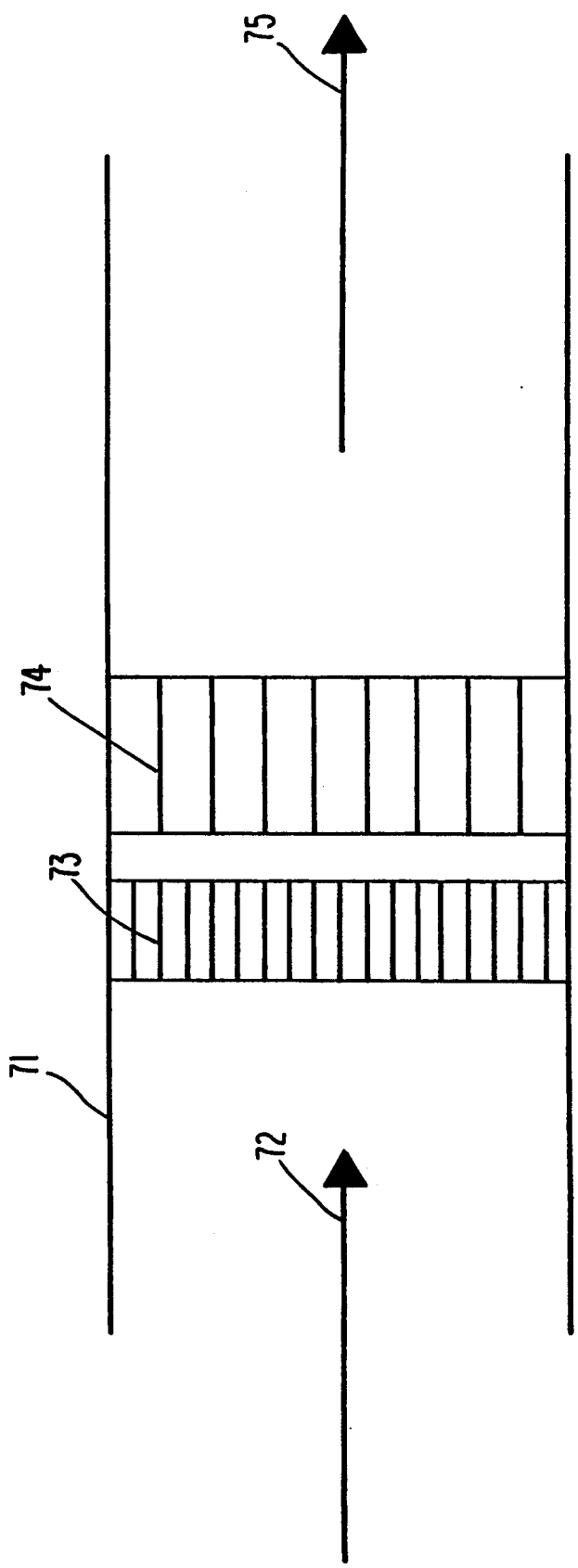
FIG. 7 is a schematic diagram of a two-stage combustion apparatus, made according to the present invention.

FIG. 7 is a schematic diagram of a two-stage combustion apparatus made according to the present invention. The apparatus is disposed within housing 71, and the fuel-air mixture enters in the direction shown by arrow 72. Ignition stage reactor 73 is constructed according to any of the embodiments described above, and catalytically ignites the fuel-air mixture. The second stage reactor is indicated by reference numeral 74. The fully combusted gas leaves the apparatus as indicated by arrow 75. Additional combustion stages can be provided.

In the specific example of FIG. 7, the second stage reactor is also the final combustion stage. The combustion stage or stages, following the ignition stage, can include a high-temperature catalyst, such as an oxide of a rare earth metal, or a refractory metal silicide as described in the above-cited U.S. patent application Ser. No. 279,455. The stages which follow the ignition stage can also be non-catalytic, and the latter alternative is within the scope of the invention.

The concept of partially combusting a fuel-air mixture in a honeycomb having coated channels alternating with uncoated channels has been disclosed by Arisaki in Japanese Patent Publication No. 61-259013. When the density of the channels is higher than about 100 per square inch, it is impractical to coat individual channels in a honeycomb that is already formed. Arisaki provides no method for doing this.

When a strip of metal is corrugated, coated with catalyst on just one side, and then folded upon itself, it is practical to obtain a density of channels as high as 500 per square inch. In addition, the coating can be applied continuously, to a moving strip of metal, on an assembly line. It is preferred that the density of channels be at least about 100 per square inch.

U.S. Pat. No. 4,711,009, the disclosure of which is incorporated by reference herein, describes a continuous process for corrugating a metal strip, coating the strip with catalyst, and folding the strip upon itself to form a honeycomb. In the process of U.S. Pat. No. 4,711,009, the strip is coated with catalyst on both sides, as shown in FIG. 8 of the patent. For purposes of the present invention, it is only necessary to modify the process of latter patent so that the catalyst coating is applied to just one side of the strip. The coating can be applied by spraying or by a roller that is wetted with the washcoat or with a solution of the catalyst metal.

The invention can be modified in various ways. If catalysts are used in the combustion stages which follow the ignition stage, they can be virtually any catalysts capable of withstanding the high temperatures of combustion. These subsequent combustion stages can assume varying shapes, and need not all be of the same type. All such modifications, which will be apparent to those skilled in the art, should be deemed within the spirit and scope of the following claims.

What is claimed is:

1. A method of making a catalytic reactor from a strip of metal, the method comprising the steps of:
   a) corrugating the strip of metal,
   b) coating one side of the strip with catalyst, while leaving the other side of the strip uncoated,
   c) folding the strip once upon itself about a point near the midpoint of the strip, and
   d) winding the folded strip into a spiral, wherein the catalyst coating is applied in bands that are separated by uncoated bands.

2. A method of making a catalytic reactor from a strip of metal, the method comprising the steps of:
   a) corrugating the strip of metal,
   b) coating one side of the strip with a catalyst, and leaving the other side of the strip uncoated, and
   c) folding the strip back and forth upon itself, wherein the catalyst coating is applied in bands that are separated by uncoated bands.

3. A method of making a catalytic reactor from a strip of metal, the method comprising the steps of:
   a) corrugating the strip of metal,
   b) coating one side of the strip with catalyst, while leaving the other side of the strip uncoated,
   c) folding the strip once upon itself about a point near the midpoint of the strip, and
   d) winding the folded strip into a spiral, wherein the coating step is completed before beginning the folding and winding steps.

4. The method of claim 3, wherein the corrugations have a herringbone pattern such that the corrugations form channels when the strip is wound into a spiral.

5. The method of claim 3, wherein the catalyst coating is applied in bands that are separated by uncoated bands.

6. The method of claim 3, wherein the steps of corrugating and coating the strip are performed continuously on a moving strip.

7. A method of making a catalytic reactor from two strips of metal, the method comprising the steps of:
   a) corrugating both strips of metal,
   b) coating one side of both strips with catalyst, while leaving the other side of the strips uncoated,
   c) placing the strips together to form a double layer, the corrugations on the strips being oriented such that the layers do not nest together, and
   d) winding the strips into a spiral, wherein the coating step is completed before beginning the placing and winding steps.

8. The method of claim 7, wherein the corrugations have a herringbone pattern such that the corrugations form channels when the strips are wound into a spiral.

9. The method of claim 7, wherein the catalyst coating is applied in bands that are separated by uncoated bands.

10. The method of claim 7, wherein the steps of corrugating and coating the strips are performed continuously on a moving strip.

11. A method of making a catalytic reactor from two strips of metal, the method comprising the steps of:
    a) corrugating both strips of metal,
    b) coating both sides of the strips with a washcoat capable of being impregnated with a catalyst,
    c) coating one side of the washcoat-bearing strips with catalyst, while leaving the other side of the strips without catalyst,
    d) placing the strips together to form a double layer, the corrugations on the strips being oriented such that the layers do not nest together, and
    d) winding the strips into a spiral, wherein both coating steps are completed before beginning the placing and winding steps.

12. The method of claim 11, wherein the corrugations have a herringbone pattern such that the corrugations form channels when the strips are wound into a spiral.

13. The method of claim 11, wherein the catalyst coating is applied in bands that are separated by uncoated bands.

14. The method of claim 11, wherein the steps of corrugating and coating the strips are performed continuously on a moving strip.

15. A method of making a catalytic reactor from a strip of metal, the method comprising the steps of:
    a) corrugating the strip of metal,
    b) coating both sides of the strip with a washcoat capable of being impregnated with a catalyst,
    c) coating one side of the strip with a catalyst, while leaving the other side of the strip without catalyst,
    d) folding the strip back and forth upon itself, and wherein the catalyst coating is applied in bands that are separated by uncoated bands.

16. A method of making a catalytic reactor from two strips of metal, the method comprising the steps of:
    a) corrugating both strips of metal,
    b) coating one side of both strips with catalyst, while leaving the other side of the strips uncoated, c) placing the strips together to form a double layer, the corrugations on the strips being oriented such that the layers do not nest together, and d) winding the strips into a spiral, wherein the catalyst coating is applied in bands that are separated by uncoated bands.

17. A method of making a catalytic reactor from two strips of metal, the method comprising the steps of:

a) corrugating both strips of metal, b) coating both sides of the strips with a washcoat capable of being impregnated with a catalyst, c) coating one side of the washcoat-bearing strips with catalyst, while leaving the other side of the strips without catalyst, d) placing the strips together to form a double layer, the corrugations on the strips being oriented such that the layers do not nest together, and e) winding the strips into a spiral, wherein the catalyst coating is applied in bands that are separated by uncoated bands.

* * * * *